United States Patent
Khan et al.

(10) Patent No.: US 8,619,539 B2
(45) Date of Patent: Dec. 31, 2013

(54) MIMO CONTROL SIGNALING IN A WIRELESS COMMUNICATION SYSTEM

(75) Inventors: Farooq Khan, Allen, TX (US); Zhouyue Pi, Richardson, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 271 days.

(21) Appl. No.: 13/036,661

(22) Filed: Feb. 28, 2011

(65) Prior Publication Data
US 2011/0149715 A1 Jun. 23, 2011

Related U.S. Application Data

(63) Continuation of application No. 11/882,313, filed on Jul. 31, 2007, now Pat. No. 7,916,621.

(60) Provisional application No. 60/899,490, filed on Feb. 5, 2007.

(51) Int. Cl.
*H04L 5/04* (2006.01)
(52) U.S. Cl.
USPC .......................................... 370/204
(58) Field of Classification Search
USPC ................... 370/203–210, 328–339
See application file for complete search history.

(56) References Cited

U.S. PATENT DOCUMENTS

| | | |
|---|---|---|
| 2007/0036067 A1 | 2/2007 | Zhang et al. |
| 2008/0187030 A1 | 8/2008 | Khan |
| 2010/0027697 A1 | 2/2010 | Malladi et al. |

OTHER PUBLICATIONS

R1-061127, "Comparison between Single and Multiple Codewords for Precoded MIMO", Intel Corporation, May 2006, 7 pages.
R1-060457, "Description of Single and Multi Codeword Schemes with Precoding", Qualcomm Europe, Feb. 2006, 9 pages.

*Primary Examiner* — Frank Duong (57) ABSTRACT

The present invention relates to a method for data transmission in a communication system. The method includes determining, at the transmitter, whether to transmit data signal using a single codeword or two codewords. When it is determined that the single codeword transmission is used, coding, by the transmitter, a control signal by using a first signal format, with the control signal coded by the first signal format carrying information regarding the single codeword. When it is determined that the two codewords transmission is used, coding, by the transmitter, the control signal by using a second signal format, with the control signal coded by the second signal format carrying information regarding both of the two codewords. The method also includes transmitting the data signal and the control signal according to the determined transmission format from the transmitter to the receiver.

19 Claims, 13 Drawing Sheets

Example, Format I, QPSK, 1/3

| UE ID | Resource Assign. | CW1 Payload | CW1 Mod. | CW1 HARQ Info. | MIMO Info. |
|---|---|---|---|---|---|
| 210 | 211 | 212 | 213 | 214 | 218 |

Example, Format II, QPSK, 1/2

| UE ID | Resource Assign. | CW1 Payload | CW1 Mod. | CW1 HARQ Info. | CW2 Payload | CW2 Mod. | CW2 HARQ Info. | MIMO Info. |
|---|---|---|---|---|---|---|---|---|
| 220 | 221 | 222 | 223 | 224 | 225 | 226 | 227 | 228 |

Rank-2 UE

MIMO CONTROL SIGNALING IN A WIRELESS COMMUNICATION SYSTEM

CLAIM OF PRIORITY

The present application is a continuation of U.S. Non-Provisional patent application Ser. No. 11/882,313, filed Jul. 31, 2007 now U.S. Pat. No. 7,916,621, entitled "MIMO CONTROL SIGNALING IN A WIRELESS COMMUNICATION SYSTEM". U.S. Non-Provisional patent application Ser. No. 11/882,313 claims priority under 35 U.S.C. §119(e) to U.S. Provisional Patent Application No. 60/899,490, filed Feb. 5, 2007, entitled "MIMO CONTROL SIGNALING IN A WIRELESS COMMUNICATION SYSTEM". U.S. Non-Provisional patent application Ser. No. 11/882,313 and U.S. Provisional Patent Application No. 60/899,490 are hereby incorporated by reference into the present application as if fully set forth herein.

BACKGROUND OF THE INVENTION

The present invention relates to a method for transmitting data in a communication system, and more specifically, a method for transmitting information regarding codewords in a multiple input multiple output system.

Description of the Related Art

Orthogonal Frequency Division Multiplexing (OFDM) is a popular wireless communication technology used to multiplex data in the frequency domain.

A multiple antenna communication system, which is often referred to as multiple input multiple output (MIMO) system, is widely used in combination with OFDM technology, in a wireless communication system to improve system performance.

In a MIMO system, both transmitter and receiver are equipped with multiple antennas. Therefore, the transmitter is capable of transmitting independent data streams simultaneously in the same frequency band. Unlike traditional means of increasing throughput (throughput is the amount of data transmitted per time unit) by increasing bandwidth or increasing overall transmission power, MIMO technology increases the spectral efficiency of a wireless communication system by exploiting the additional dimension of freedom in the space domain due to multiple antennas. Therefore MIMO technology can significantly increase the throughput and range of the system.

Data transmission in a MIMO system may use a single codeword MIMO transmission scheme or a multiple codewords MIMO transmission scheme.

In the single-codeword MIMO transmission scheme, a single codeword is used for the data to be transmitted. That is, in a single-codeword MIMO transmission scheme, a cyclic redundancy check (CRC) is added to a single data block and then coding and modulation are sequentially performed. Subsequently, the coded and modulated data block is demultiplexed into multiple symbols for transmission over multiple antennas.

In the multiple-codeword MIMO transmission, a single data block is first demultiplexed into smaller stream blocks, and each stream block uses a different codeword. That is, after demultiplexation, individual CRCs are attached to these smaller stream blocks and then separate coding and modulation are performed on these smaller blocks. These smaller blocks are then transmitted via separate MIMO antennas.

For a single-user 4×4 MIMO (i.e., 4 transmitting antennas and 4 receiving antennas) system, the minimum number of MIMO codewords (CW) that can be used is one, while the maximum number of codewords that can be used is two. For rank greater than 1 (i.e., more than one MIMO layer), that is rank-2, rank-3 or rank-4, two codewords are used for data transmission. In case of rank-1 transmission (i.e., one data stream is transmitted), a single codeword (CW1) is used for data transmission. In case of rank-2, CW1 is used for the first layer layer-1 (i.e., first data stream) and CW2 is used for the second layer layer-2 (i.e., second data stream). In case of rank-3, CW1 is used for layer-1 while CW2 is used for both layer-2 and layer-3; or, alternatively, CW1 is used for both layer-1 and layer-2 while CW2 is used for layer-3. In case of rank-4, CW1 is used for layer-1 while CW2 is used for the remaining layers (i.e., layer-2, layer-3 and layer-4); or, alternatively, CW1 is used for layer-1 and layer-2 while CW2 is used for layer-3 and layer-4.

When data is transmitted in a contemporary single-user 4×4 MIMO system, control signals that indicate whether one codeword MIMO scheme or two codeword MIMO schemes is used for the transmission, are coded using a single signal format. This results in inefficient use of the system resources.

SUMMARY OF THE INVENTION

It is therefore an object of the present invention to provide an improved method for data transmission in a communication system.

It is another object to provide a method for data transmission to efficiently use transmission resources.

According to one aspect of the present invention, there is provided a method for performing data transmission between a transmitter and a receiver in a communication system. The method includes determining, at the transmitter, whether to transmit data signal using a single codeword or two codewords, when it is determined that the single codeword transmission is used, coding, by the transmitter, a control signal by using a first signal format, with the control signal coded by the first signal format carrying information regarding the single codeword, when it is determined that the two codewords transmission is used, coding, by the transmitter, the control signal by using a second signal format, with the control signal coded by the second signal format carrying information regarding both of the two codewords, and transmitting the data signal and the control signal according to transmission information carried in the control signal.

When a receiver receives data signal and control signal transmitted from the transmitter, the receiver may decode the control signal using the first signal format and determine whether the decoding of the control signal using the first signal format is performed successfully or not. When the decoding of the control signal using the first signal format is performed successfully, the receiver processes the data signal by assuming that the data is transmitted using the single codeword transmission. When the decoding is performed unsuccessfully, the receiver decodes the control signal using the second signal format and determines whether the decoding of the control signal using the second signal format is performed successfully. When the decoding of the control signal using the second signal format is performed successfully, the receiver processes the data signal by assuming that the data is transmitted using the two codewords transmission. When the decoding is performed unsuccessfully, the receiver terminates the processing of the data signal.

Alternatively, the receiver may first determine whether the transmitter transmits the data signal using a rank value of 1 or a higher rank value. When it is determined that the transmitter transmits the signal using a rank value of 1, the receiver decodes the control signal using the first signal format and determines whether the decoding of the control signal using the first signal format is performed successfully. When the decoding of the control signal using the first signal format is performed successfully, the receiver processes the data signal by assuming that the data is transmitted using the single codeword transmission. When the decoding is performed unsuccessfully, the receiver terminates the processing of the data signal.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will be described more fully hereinafter with reference to the accompanying drawings, in which preferred embodiments of the invention are shown. As those skilled in the art would realize, the described embodiments may be modified in various different ways, all without departing from the spirit or scope of the present invention.

Figure 1:
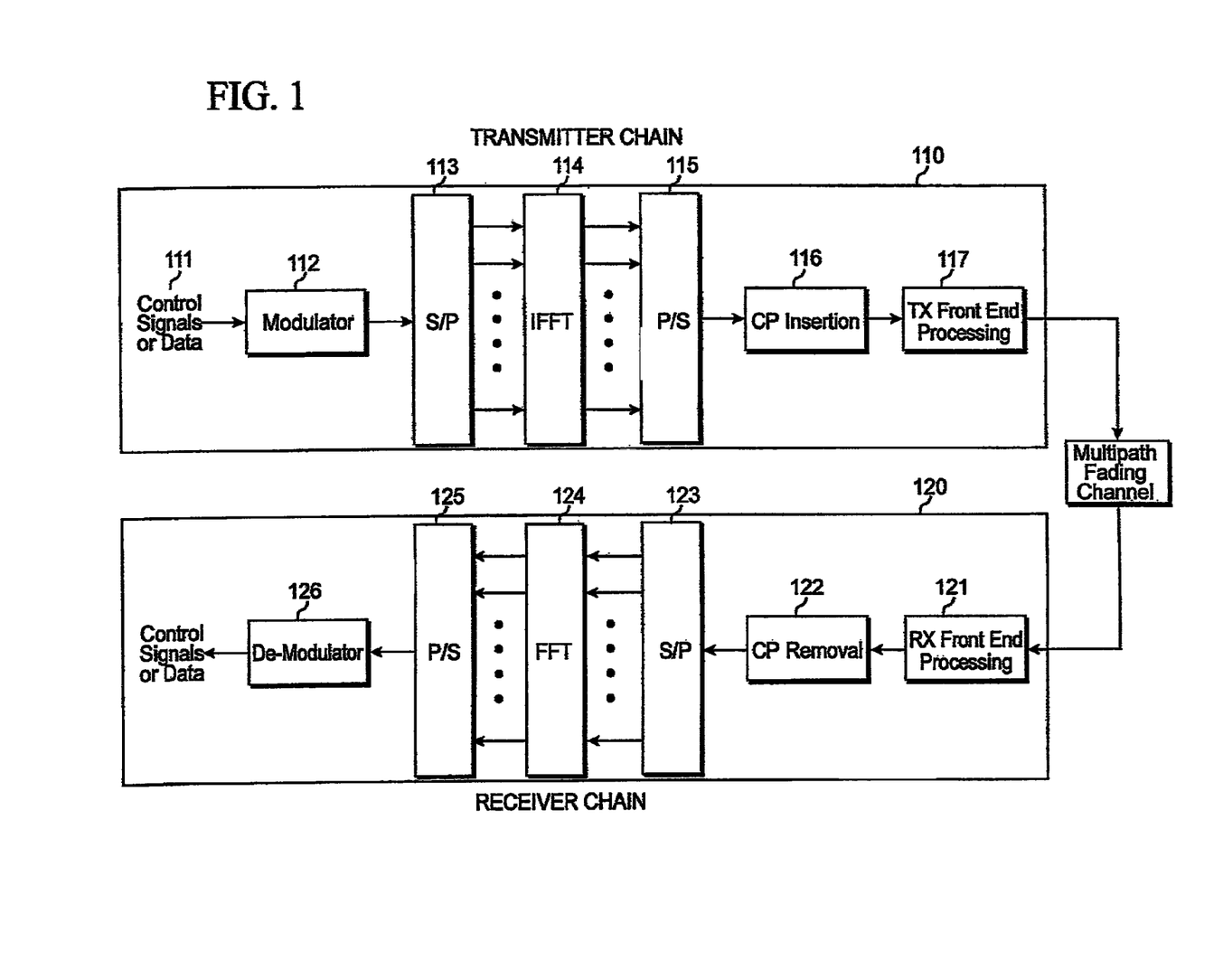
FIG. 1 is an illustration of an Orthogonal Frequency Division Multiplexing (OFDM) transceiver chain suitable for the practice of the principles of the present inventions.

FIG. 1 illustrates an Orthogonal Frequency Division Multiplexing (OFDM) transceiver chain. In a contemporary communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 2:
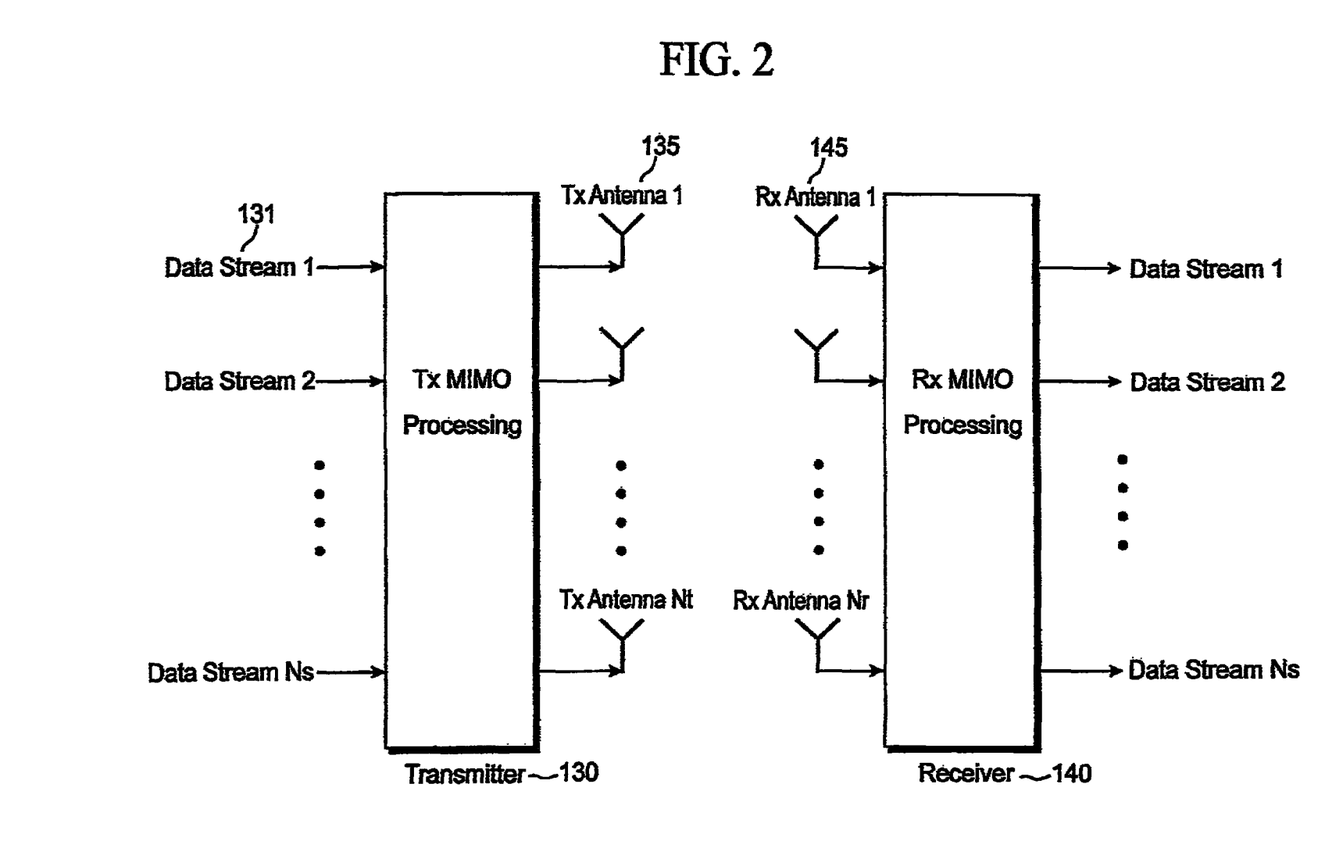
FIG. 2 is an illustration of a multiple input multiple output (MIMO) system suitable for the practice of the principles of the present inventions.

FIG. 2 illustrates a multiple input multiple output (MIMO) system. In a MIMO system, transmitter 130 and receiver 140 are respectively equipped with multiple antennas 135 and 145. Therefore, transmitter 130 is capable of transmitting independent data streams 131 simultaneously in the same frequency band.

Figure 3:
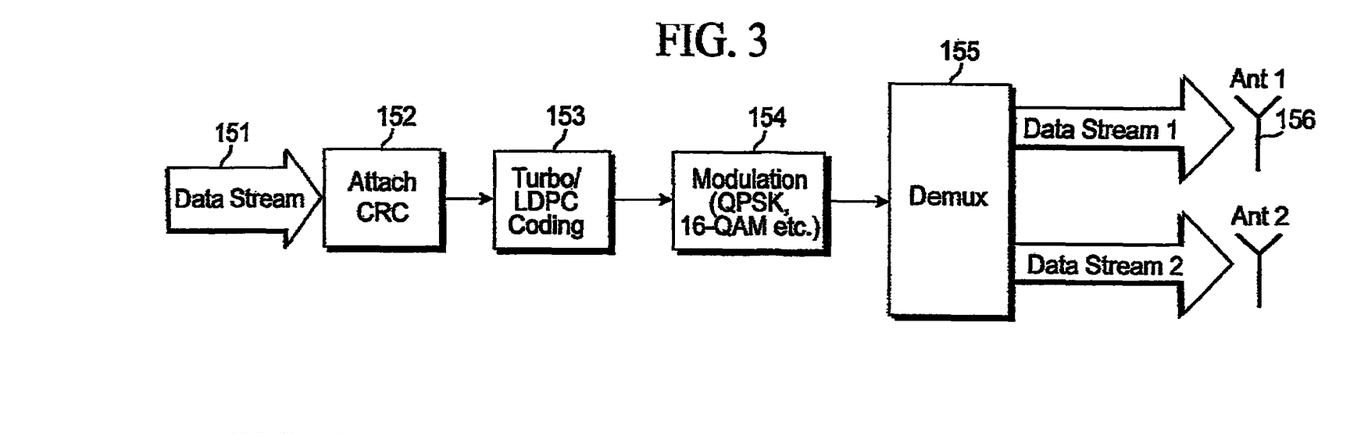
FIG. 3 is an illustration of a single-code word MIMO scheme suitable for the practice of the principles of the present inventions.

An example of a single-codeword MIMO scheme is given in FIG. 3. In case of single-codeword MIMO transmission, a single codeword is used for the data to be transmitted. A cyclic redundancy check (CRC) 152 is added to a single data stream 151 and then coding 153 using Low Density Parity Check (LDPC) codeword and modulation 154 are sequentially performed. The coded and modulated symbol is then demultiplexed 155 for transmission over multiple antennas 156.

Figure 4:
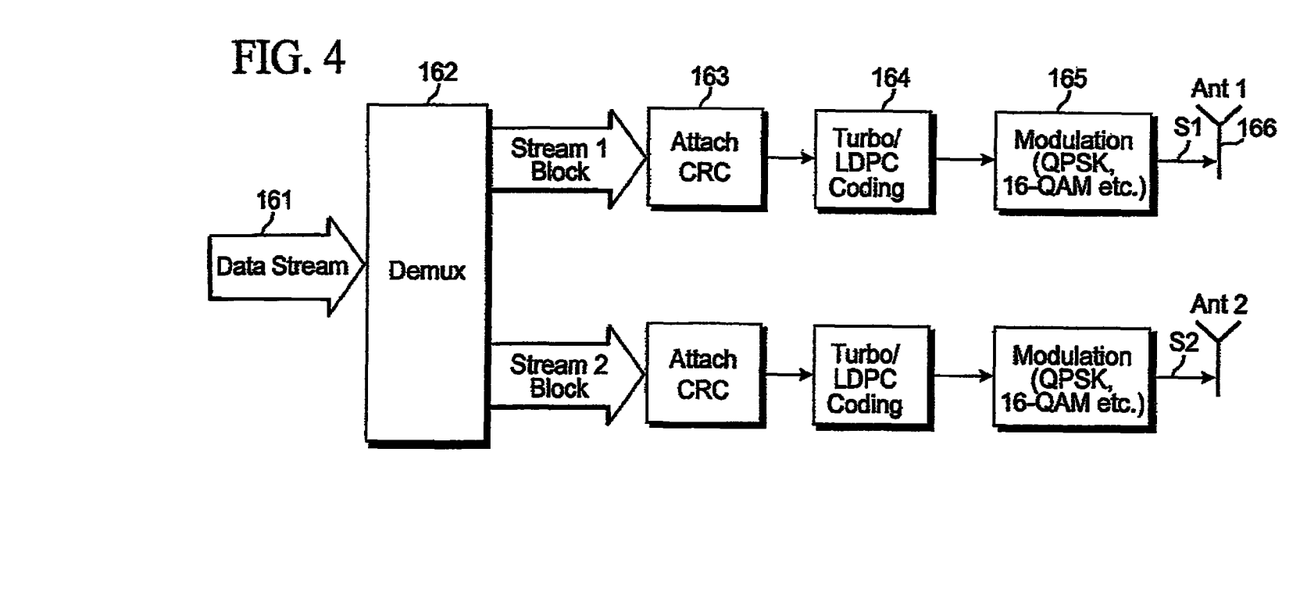
FIG. 4 is an illustration of a multi-code word MIMO scheme suitable for the practice of the principles of the present inventions.

In case of multiple-codeword MIMO transmission, as shown in FIG. 4, data stream 161 is demultiplexed 162 into smaller stream blocks. Individual CRCs 163 are attached to these smaller stream blocks and then separate coding 164 using different codeword and modulation 165 are performed on these smaller blocks. These smaller blocks are then transmitted via separate MIMO antennas 166. It should be noted that in case of multi-codeword MIMO transmissions, different modulation and coding can be used on each of the individual streams resulting in a so called PARC (per antenna rate control) scheme. Also, multi-codeword transmission allows for more efficient post-decoding and interference cancellation because a CRC check can be performed on each of the codewords before the codeword is cancelled from the overall signal. In this way, only correctly received codewords are cancelled to avoid any interference propagation in the cancellation process.

A popular closed-loop MIMO scheme is MIMO precoding. With precoding, the data streams to be transmitted are precoded, i.e., pre-multiplied by a precoding matrix, before being passed on to the multiple transmit antennas in a transmitter.

Figure 5A:
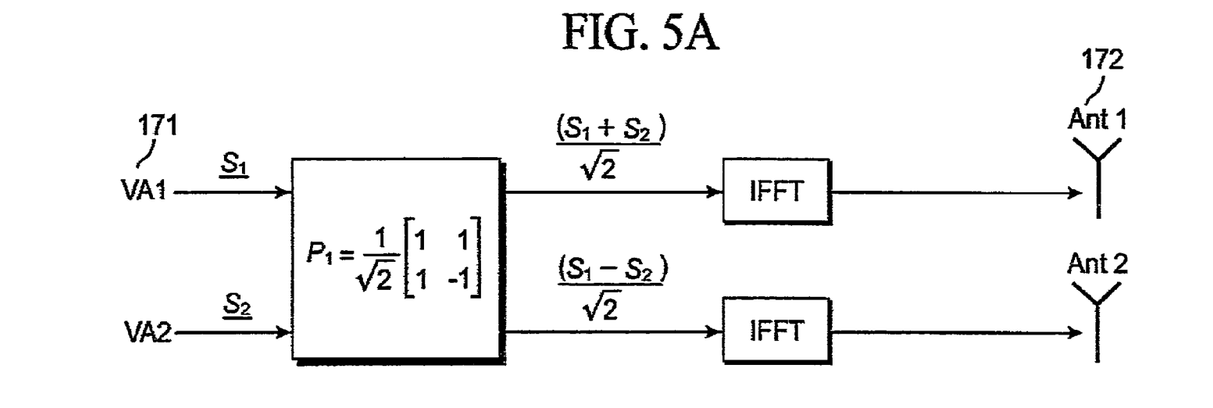
FIG. 5A and FIG. 5B are examples of precoding in a precoding MIMO-system suitable for the practice of the principles of the present inventions.
Figure 5B:
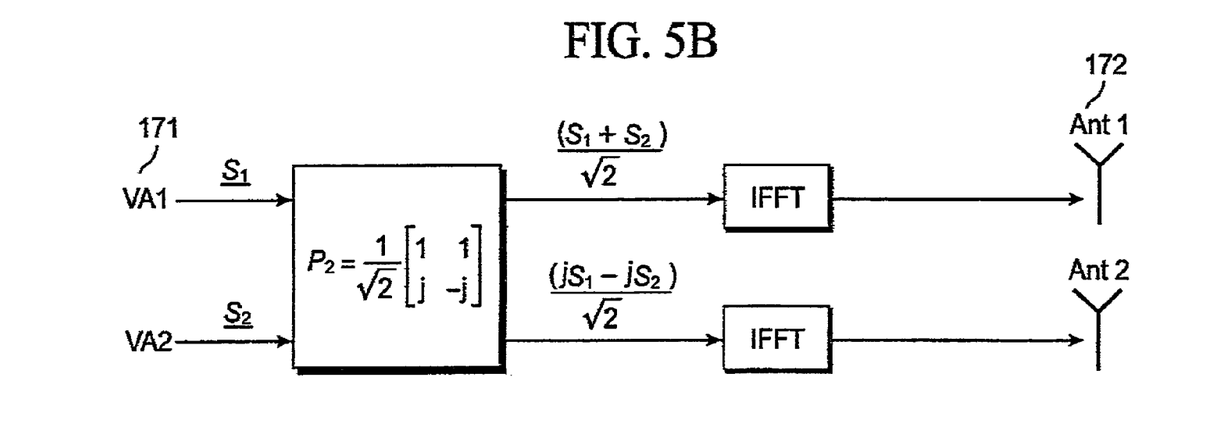

An optional precoding protocol that employs a unitary pre-coding before mapping the data streams to physical antennas is shown in FIGS. 5A and 5B. The optional precoding creates a set of virtual antennas (VA) 171 before the pre-coding. In this case, each of the codewords is potentially transmitted through all the physical transmission antennas 172. Two examples of unitary precoding matrices, $P_1$ and $P_2$ for the case of two transmission antennas 172 can be:

$$P_1 = \frac{1}{\sqrt{2}}\begin{bmatrix} 1 & 1 \\ 1 & -1 \end{bmatrix}, P_2 = \frac{1}{\sqrt{2}}\begin{bmatrix} 1 & 1 \\ j & -j \end{bmatrix} \quad (1)$$

Assuming modulation symbols $S_1$ and $S_2$ are transmitted at a given time via stream 1 and stream 2 respectively. Then the modulation symbol $T_1$ after preceding with matrix $P_1$ in the example as shown in FIG. 5A and the modulation symbol $T_2$ after precoding with matrix $P_2$ in the example as shown in FIG. 5B can be respectively written as:

$$T_1 = P_1\begin{bmatrix} S_1 \\ S_2 \end{bmatrix} = \frac{1}{\sqrt{2}}\begin{bmatrix} 1 & 1 \\ 1 & -1 \end{bmatrix} \times \begin{bmatrix} S_1 \\ S_2 \end{bmatrix} = \frac{1}{\sqrt{2}}\begin{bmatrix} S_1 + S_2 \\ S_1 - S_2 \end{bmatrix} \quad (2)$$

$$T_2 = P_2\begin{bmatrix} S_1 \\ S_2 \end{bmatrix} = \frac{1}{\sqrt{2}}\begin{bmatrix} 1 & 1 \\ j & -j \end{bmatrix} \times \begin{bmatrix} S_1 \\ S_2 \end{bmatrix} = \frac{1}{\sqrt{2}}\begin{bmatrix} S_1 + S_2 \\ jS_1 - jS_2 \end{bmatrix}$$

Therefore, the symbols $$T_{11} = \frac{(S_1 + S_2)}{\sqrt{2}} \text{ and } T_{12} = \frac{(S_1 - S_2)}{\sqrt{2}}$$

will be transmitted via antenna 1 and antenna 2, respectively, when preceding is done using precoding matrix $P_1$ as shown in FIG. 5A. Similarly, the symbols $$T_{21} = \frac{(S_1 + S_2)}{\sqrt{2}} \text{ and } T_{22} = \frac{(jS_1 - jS_2)}{\sqrt{2}}$$

will be transmitted via antenna 1 and antenna 2, respectively, when precoding is done using precoding matrix $P_2$ as shown in FIG. 5B. It should be noted that precoding is done on an OFDM subcarrier level before the IFFT operation as illustrated in FIGS. 5A and 5B.

Figure 6:
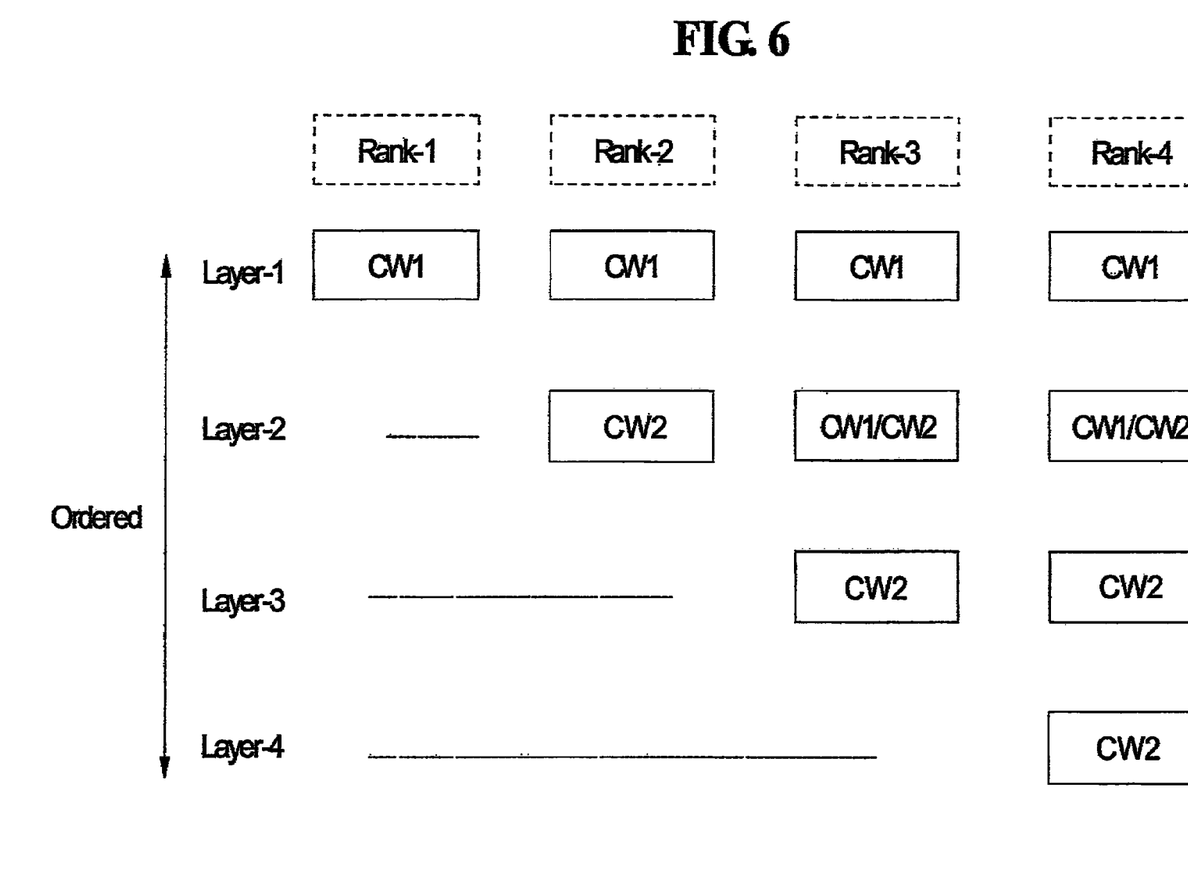
FIG. 6 is an illustration of a single user MIMO transmission scheme for rank-1, rank-2, rank-3 and rank-4.

Some possible codeword transmission structures for multi-codeword (MCW) single-user 4×4 MIMO (i.e., 4 transmitting antennas and 4 receiving antennas) system are shown in FIG. 6. The minimum number of MIMO codewords (CW) that can be used in the 4×4 MIMO system is one, while the maximum number of codewords that can be used in the 4×4 MIMO system is two. For rank greater than 1 (i.e., there are more than one data streams to be transmitted), that is, rank-2, rank-3 or rank-4, two codewords are used for transmission as shown in FIG. 6. In case of rank-1 transmission, a single codeword (CW1) is used for transmission. In case of rank-2, CW1 is used for the first layer layer-1 (i.e., first data stream) and CW2 is used for the second layer layer-2 (i.e., second data stream). In case of rank-3, CW1 is used for layer-1 while CW2 is used for both layer-2 and layer-3; or, alternatively, CW1 is used for both layer-1 and layer-2 while CW2 is used for layer-3. In case of rank-4, CW1 is used for layer-1 while CW2 is used for the remaining layers (i.e., layer-2, layer-3 and layer-4); or, alternatively, CW1 is used for layer-1 and layer-2 while CW2 is used for layer-3 and layer-4.

Figure 7:
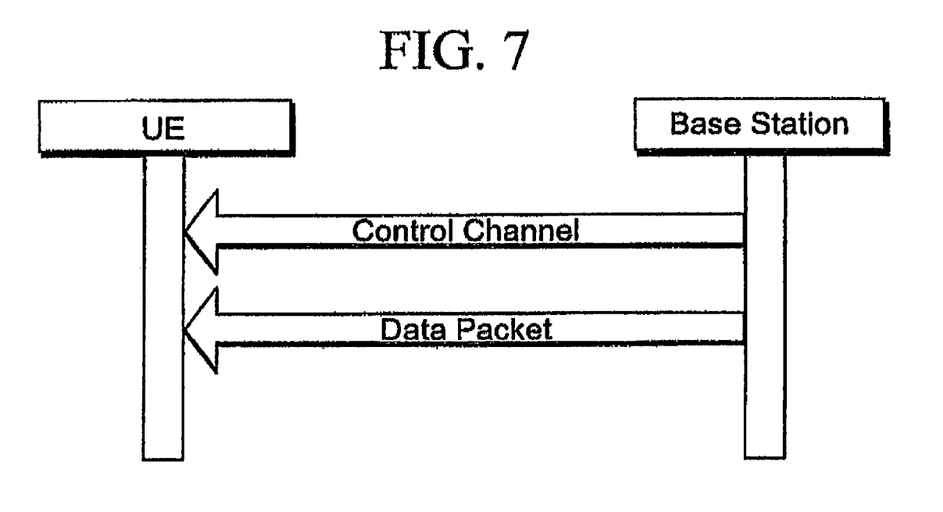
FIG. 7 is an illustration of control signaling in a wireless communication system suitable for the practice of the principles of the present inventions.

In packet-based wireless data communication systems, a control signal accompanies the data transmission as shown in FIG. 7. In the third Generation Long Term Evolution (3G LTE) system, the control channel that carries the control signal is referred to as Physical Downlink Control Channel (PDCCH). The PDCCH carries information such as user equipment (UE) ID, resource assignment information, Payload size, modulation, Hybrid Automatic Repeat-reQuest (ARQ) HARQ information, MIMO related information. A Cyclic Redundancy check calculated over the control information and masked by the UE ID can be carrier instead of explicit UE ID.

Figure 8:
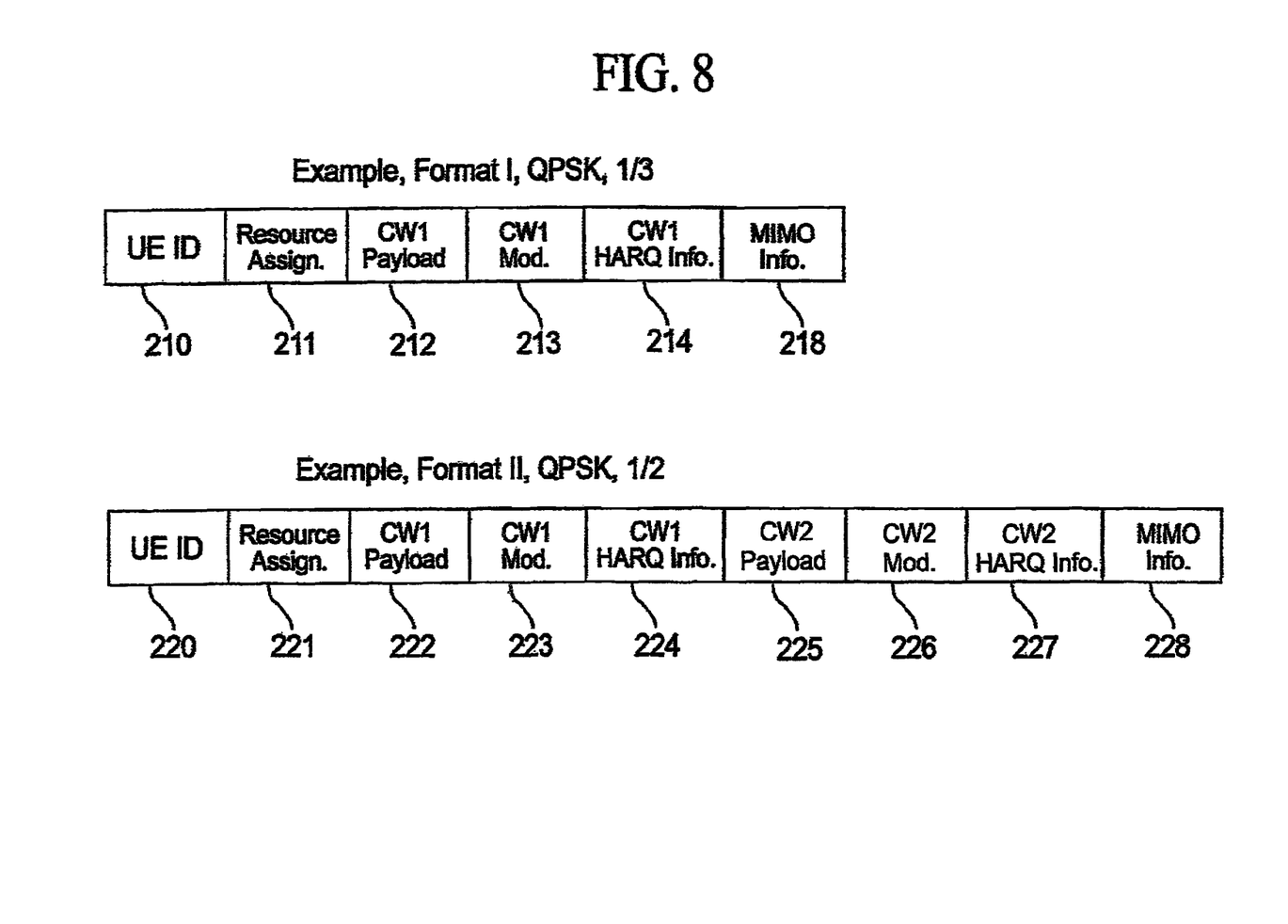
FIG. 8 illustrates control signal formats for single codeword transmission and two codewords transmission according to the principles of the present invention.

In the present invention, we disclose a scheme for transmitting control signal to the UE in order to differentiate between a single codeword (CW) transmission uses and a two codewords transmission. The control signal for either single or two CWs transmission is formatted by using two different formats Format I and Format II for Physical Downlink Control Channel (PDCCH). FIG. 8 shows an exemplary Format I for a control signal of single codeword transmission and an exemplary Format II for a control signal of two codewords transmission. The control signal using Format I is coded with code rate of 1/3 and is Quadrature Phase Shift Keying (QPSK) modulated, and contains fields carrying information for CW1. The control signal using Format II is coded with code rate of 1/2 and is QPSK modulated, and contains fields carrying information for both CW1 and CW2. The code rate indicates what portion of the total amount of information is useful. In both Format I and Format II, UE ID field 210, 220 indicates the identification of the UE (or group of UEs) for which the data transmission is intended. Resource assignment field 211, 221 indicates which (virtual) resource units (and layers in case of multi-layer transmission) the UE(s) shall demodulate. Modulation field 213, 223, 226 indicates whether the data is modulated using QPSK or 16QAM or 64QAM. Payload field 212, 222, 225 indicates the size of the data information block. Hybrid ARQ information field 214, 224, 227 carries the information of Hybrid ARQ process number, Redundancy version and New data indicator. MIMO information field 218, 228 carries information of transmission rank, selected layers, layers ordering and precoding, etc. It should be noted that the actual number of bits for these control fields may vary from one system to the other. In case of Format II for indicating transmission using two CWs, the information of Payload size, modulation and HARQ is carried in separate fields for CW1 and CW2.

The UE performs a blind detection to differentiate between Format I and Format II. Upon successful decoding the control signal using either Format I or Format II, the UE obtains information about the number of CWs transmitted and the corresponding payload size, modulation and HARQ information. Both Format I and Format II use the same physical resources. Format II uses a weaker code rate or higher order modulation in order to compensate for more information bits. It should be noted that two CWs transmission will generally be performed for UEs in good channel conditions, and hence a slightly higher signal-to-interference-plus-noise ratio (SINR) due to weaker modulation and coding may not be required.

Figure 9:
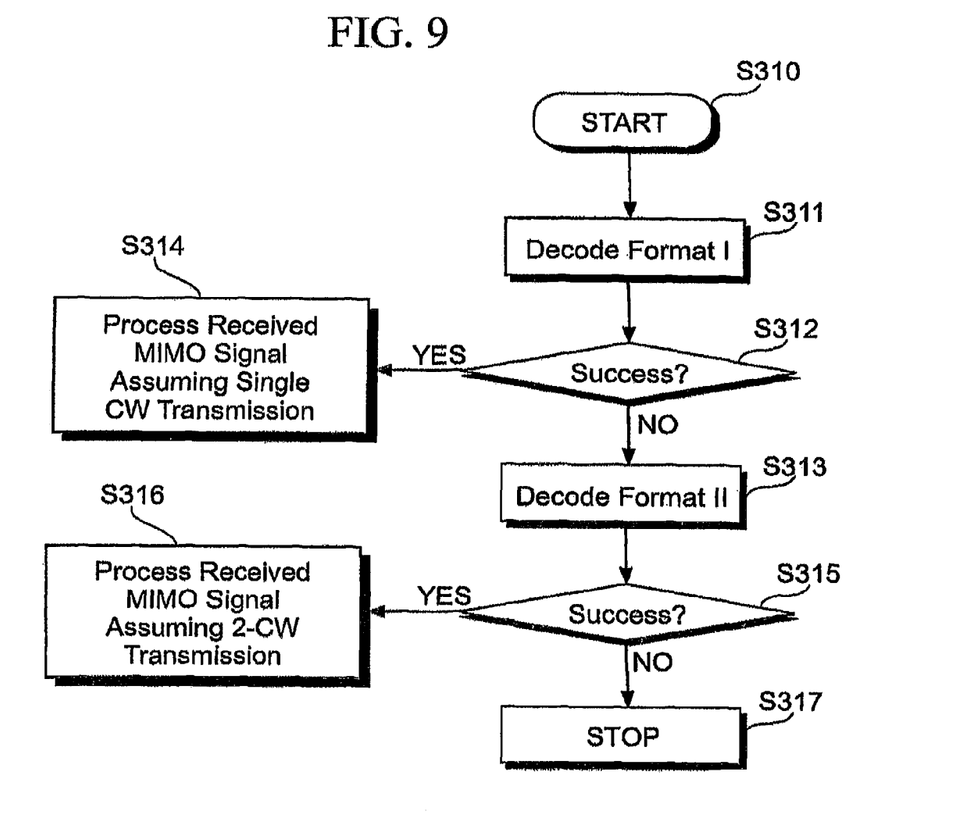
FIG. 9 is a flow chart of control signal decoding process according to a first embodiment of the principles of the present invention.

FIG. 9 shows a flow chart of a process of decoding control signal by a user equipment (UE) using either Format I or Format II as a first embodiment according to the principles of the present invention. At step S310, the UE receives a data signal and a control signal. At step S311, the UE attempts to decode the control signal using Format I. At step S312, the UE determines whether the decoding performed at step S311 is performed successfully. If the decoding is performed successfully, the UE processes the data signal by assuming that the data is transmitted using a single codeword transmission at step S314. If the decoding is performed unsuccessfully, the UE attempts to decode the control signal using Format II at step S313. At step S315, the UE determines whether the decoding performed at step S313 is performed successfully. If the decoding is performed successfully, the UE processes the data signal by assuming that the data is transmitted using a two codewords transmission at step S316. If the decoding is performed unsuccessfully, the UE stops processing data signal at step S317. It should be noted that the flow chart is shown assuming a single attempt to decode Format I and another single attempt to decode Format II. In practice, it is possible to have multiple control channels with Format I and Format II transmitted for multiple UEs scheduled simultaneously. Therefore, a given UE needs to make multiple attempts to decode Format I and also multiple attempts to decode Format II control signaling message.

Figure 10A:
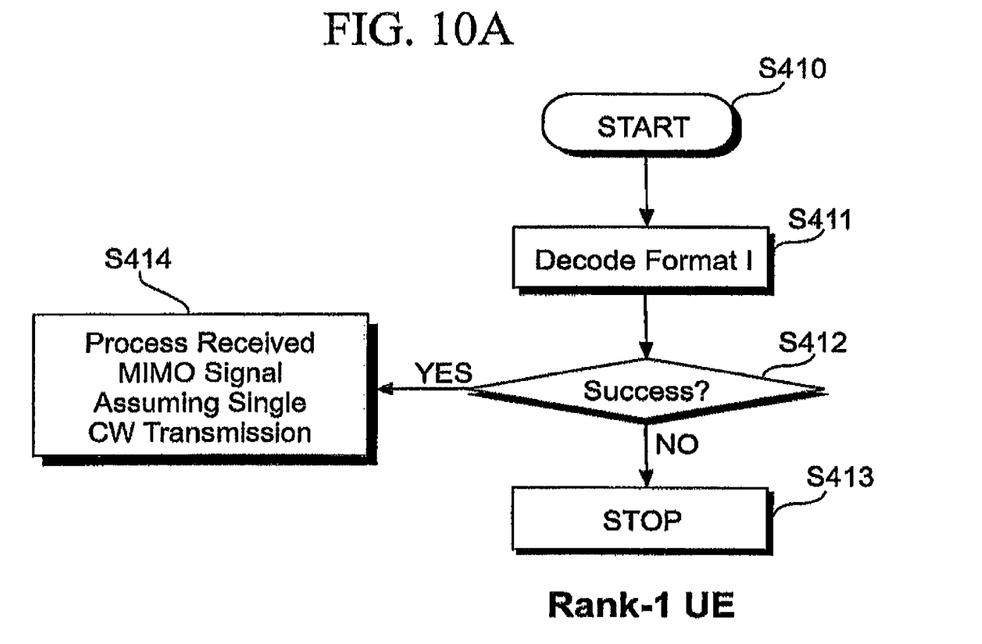
FIGS. 10A and 10B are flow charts of control signal decoding processes according to a second embodiment of the principles of the present invention.

In a second embodiment according to the principles of the present invention, the UEs expecting rank-1 transmission only decode Format I as shown in FIG. 10A. This can be achieved by limiting the maximum MIMO rank to 1 for certain UEs in the system. This information can be exchanged by using higher level signaling, for example, at the time of session set-up. Similarly, it is also possible to set the rank to greater than 1 for certain UEs. These UEs then always try to decode the PDCCH using Format II. In case where Node-B (i.e., the base station) can reduce the MIMO transmission rank, the UEs with rank greater than 1 need to decode PDCCH assuming both Format I and Format II as shown in FIG. 10B.

As shown in FIG. 10A, at step S410, the UE with MIMO transmission rank-1 receives a data signal and a control signal. At step S411, the UE attempts to decode the control signal using Format I. At step S412, the UE determines whether the decoding in step S411 is performed successfully. If the decoding is performed successfully, the UE processes the data signal by assuming that the data is transmitted using a single codeword transmission at step S414. If the decoding is performed unsuccessfully, the UE terminates the processing of the data signal at step S413.

Figure 10B:
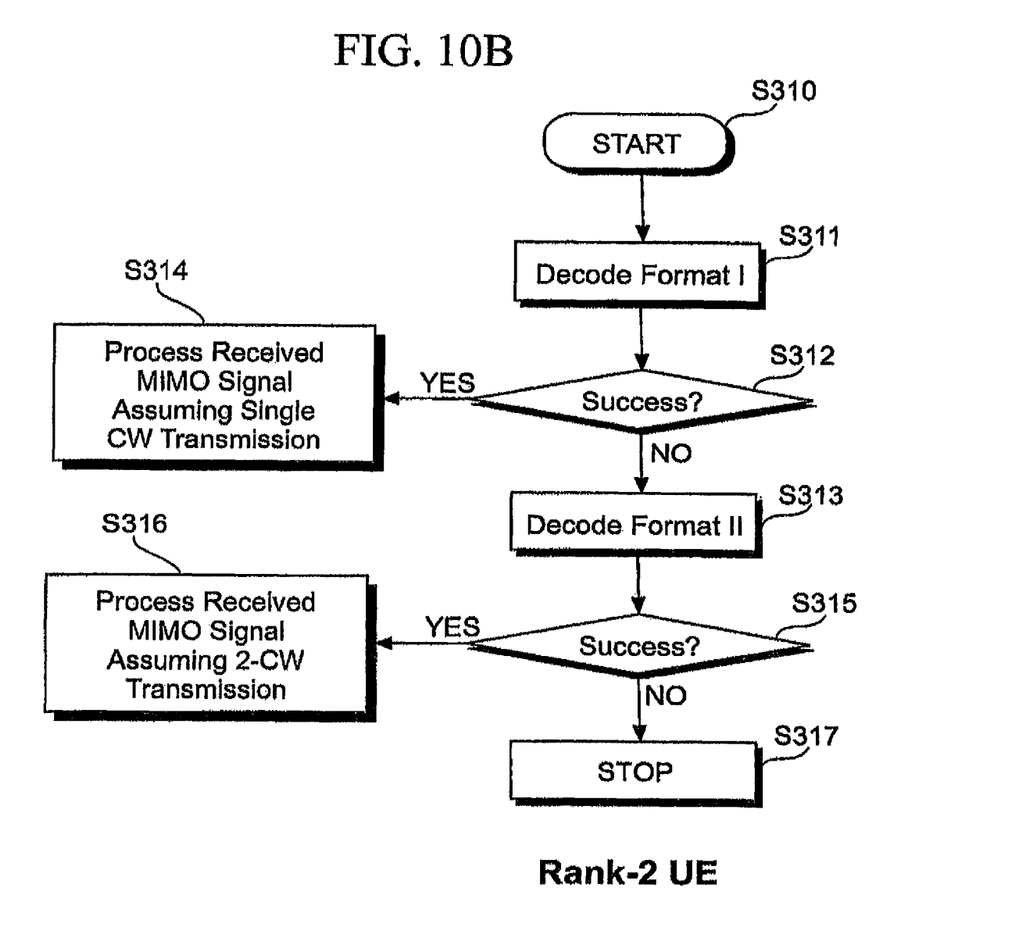

As shown in FIG. 10B, the UE with MIMO transmission rank-2 perform control channel decoding using the same method as illustrated in FIG. 9. Therefore, the explanation of this process is omitted.

Figure 11:
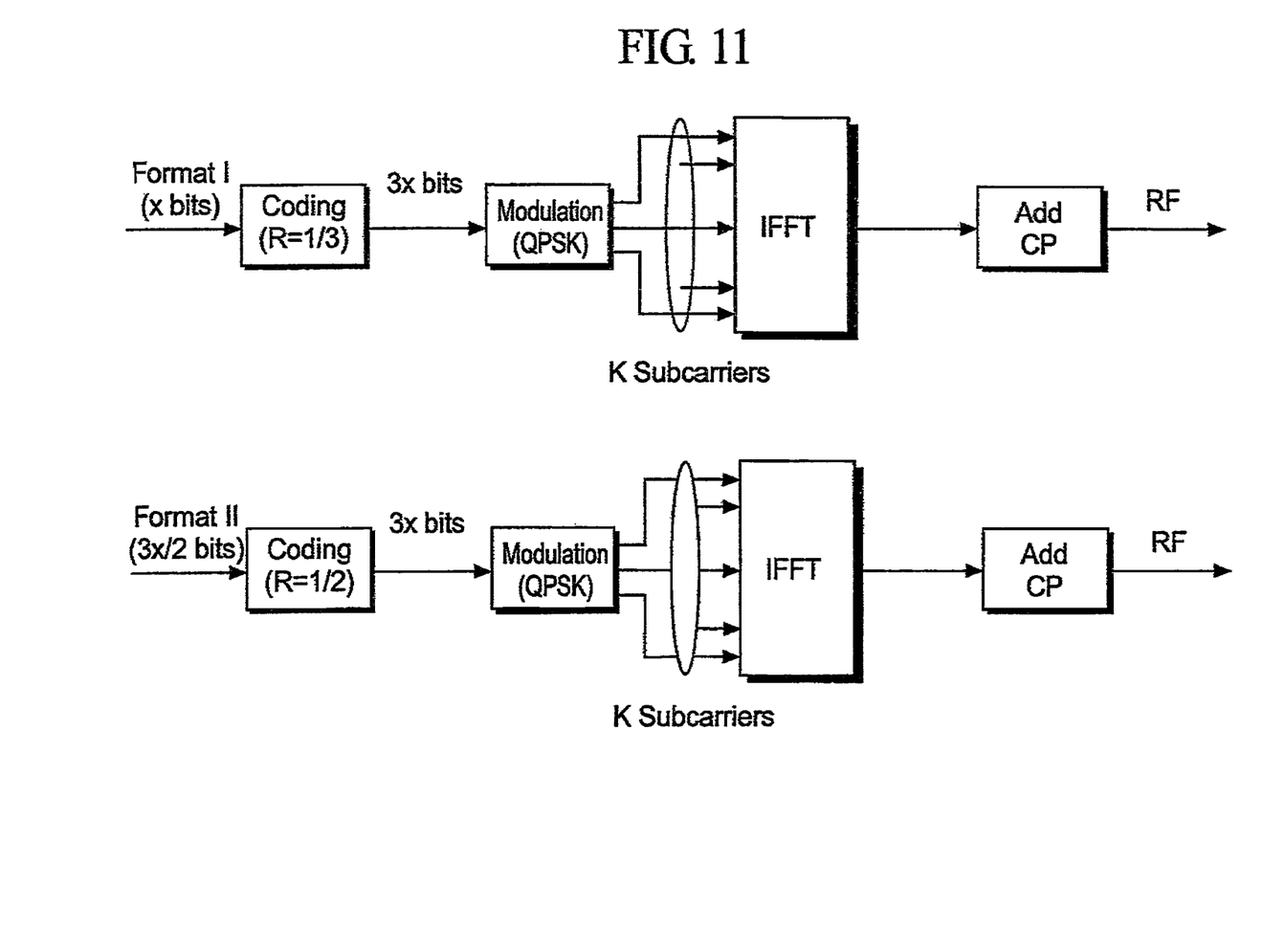
FIG. 11 illustrates channel coding and modulation for the two control signal formats according to a third embodiment of the principles of the present invention.

In a third embodiment according to the principles of the present invention as shown in FIG. 11, the control signal using Format II is coded using a weaker code rate (for example, code rate is 1/2) than the control signal using Format I (for example, code rate is 1/3). It should be noted that both of the control signal using Format I and the control signal using Format II use the same amount of physical resources, that is, the same number of modulation symbols or subcarriers for transmission. We assume that the control signal using Format II contains 50% (3/2) more bits than the control signal using Format I in this third embodiment. Both of the control signals using Format I and the control signal using Format II use the same QPSK modulation.

Figure 12:
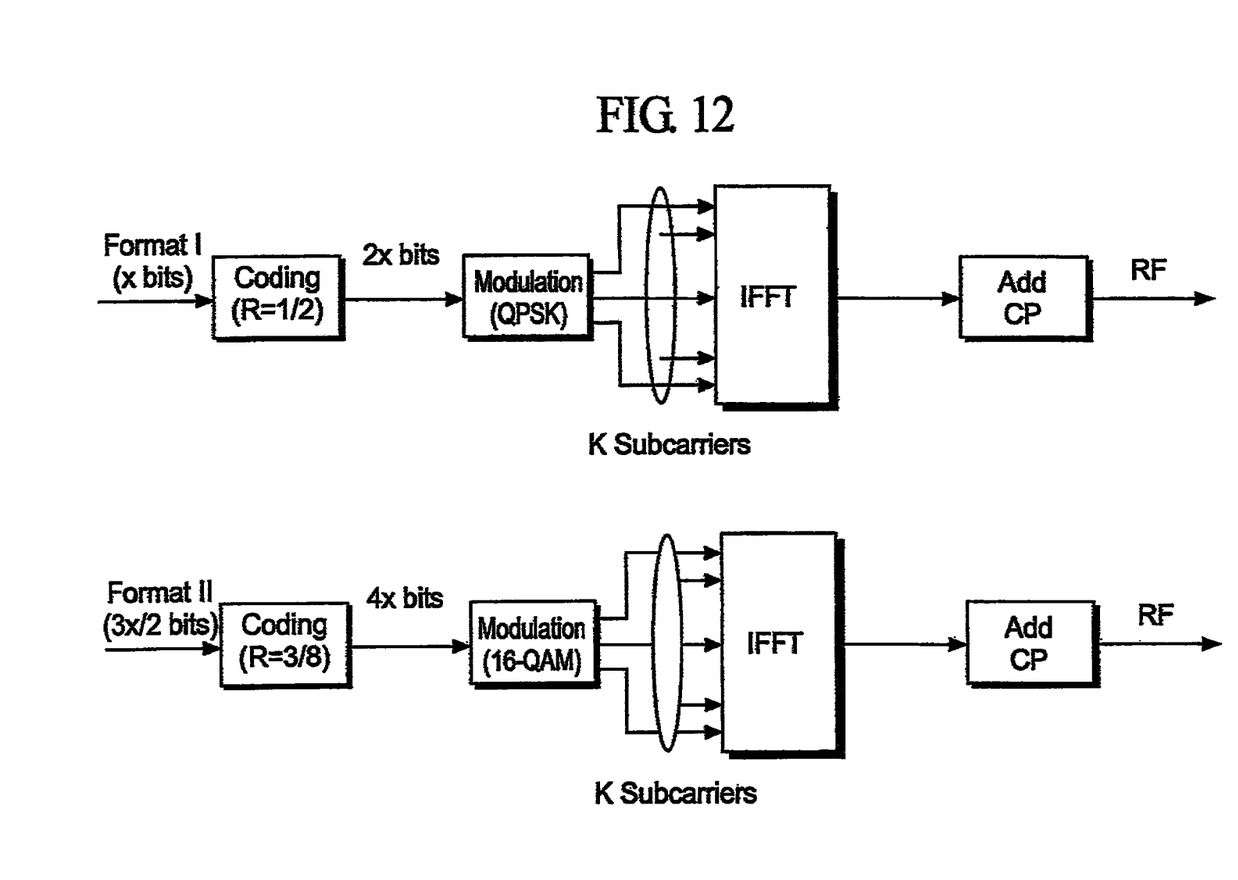
FIG. 12 illustrates channel coding and modulation for the two control signal formats according to a fourth embodiment of the principles of the present invention.

In a fourth embodiment according to the principles of the present invention as shown in FIG. 12, the control signal using Format II uses a higher order modulation and lower code rate than the control signal using Format I. That is, the control signal using Format II uses 16-QAM modulation, which is higher than the QPSK modulation used by the control signal using Format I. In addition, the control signal using Format II is coded using a code rate of 3/8 while the control signal using Format I is coded using a code rate of 1/2. Again, both formats use the same amount of physical resources, that is, the same amount of subcarriers or modulation symbols for transmission.

Figure 13:
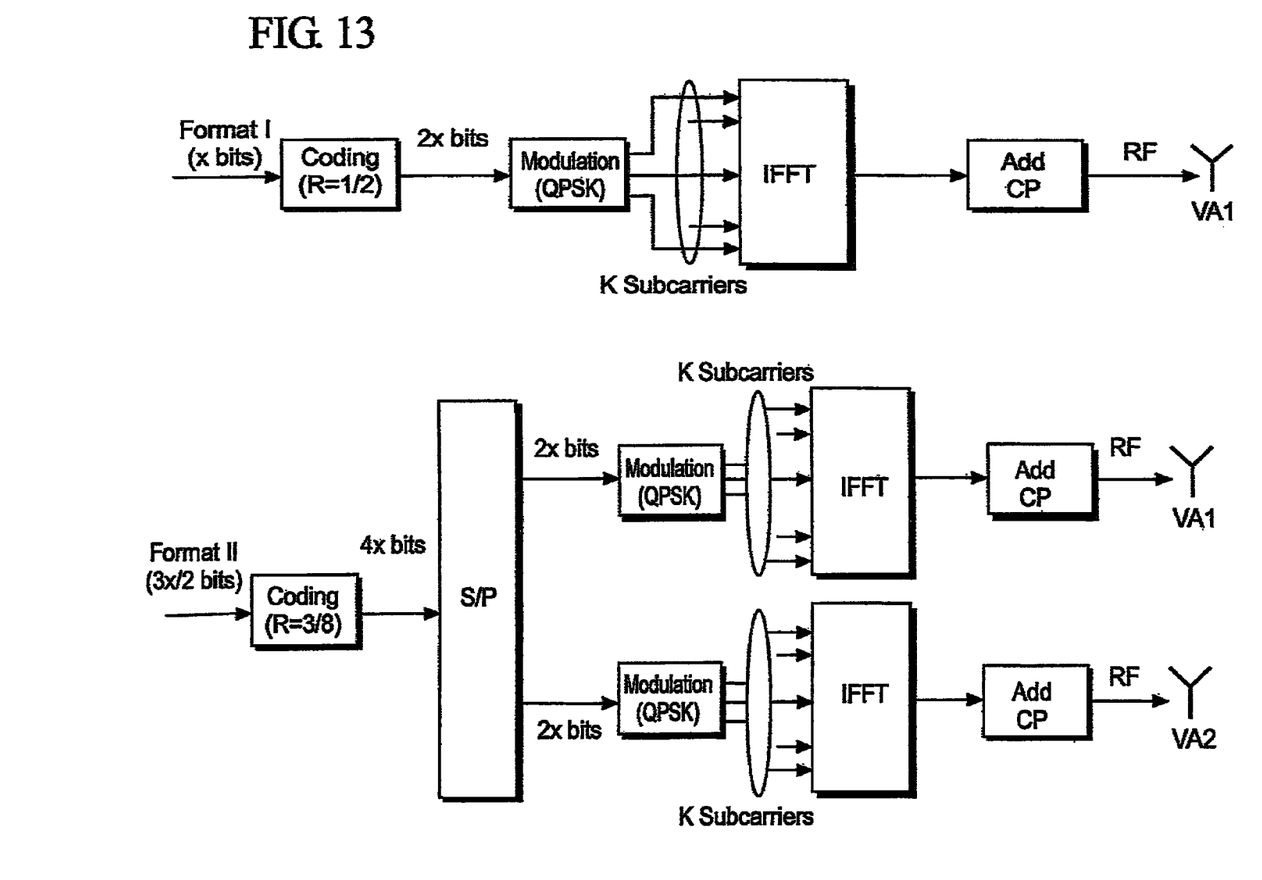
FIG. 13 illustrates channel coding and modulation for the two control signal formats according to a fifth embodiment of the principles of the present invention.

In a fifth embodiment according to the principles of the present invention as shown in FIG. 13, the control signal using Format II is transmitted using two MIMO layers (i.e., two virtual antennas (VAs)) while the control signal using Format I is transmitted using a single MIMO layer. In general, the control signal using Format II which carries control information for two codewords transmission is transmitted for the UEs that can support at least rank-2. Therefore, these UEs should also be able to decode the control information transmitted using rank-2 (2 MIMO layers).

According to the principles of the present invention, other type of MIMO related information may also be conveyed by the control channel format associated with the data channel transmission. For example, the activated layers and the ordering of these layers, the mapping from the codewords to the layers, etc.

It is also straightforward to extend this invention to convey MIMO related information by the location of the control channels in the time-frequency resources associated with the data channel transmission. For example, the location and amount of resource elements allocated for control channels for rank-1 transmission may be different from the location and amount of resource elements allocated for control channels for higher rank transmission.

As a straightforward extension, the aforementioned embodiments can be easily combined. In addition, the aforementioned embodiments can be used on other type of channels on both downlink and uplink in a variety of communication systems.

What is claimed is:

1. A method for performing data transmission, the method comprising:
   modulating a data signal at a transmitter using at least one codeword;
   formatting a control signal using a signal format based at least partly upon a total number of codewords used, with the formatted control signal carrying information for all the codewords used; and
   transmitting the data signal accompanied by the control signal to a receiver.

2. The method of claim 1, further comprising:
   decoding the control signal at a receiver by recursively applying a plurality of signal formats including the signal format used for formatting the control signal until the control signal is decoded.

3. A method for performing data transmission, the method comprising:
   modulating, at a transmitter, a data signal with either a single codeword or two codewords; and
   transmitting the modulated data signal accompanied by a control signal via the transmitter, with:
      the control signal coded with a first signal format for carrying information regarding the single codeword when the data signal is modulated with the single codeword, and
      the control signal coded with a second signal format for carrying information regarding both of the two codewords when the data signal is modulated with the two codewords.

4. The method of claim 3, wherein the control signal coded using the first signal format comprises:
   an identifier of a receiver;
   information about resource elements allocated to the data signal;
   information about the single codeword; and transmission information comprised of at least one of transmission rank, selected layers, ordering of layers, and precoding information.

5. The method of claim 3, wherein the control signal coded using the second signal format comprises:
an identifier of a receiver;
information about resource elements allocated to the data signal;
information about one of the two codewords;
information about a remaining one of the two codewords; and
transmission information comprised of at least one of transmission rank, selected layers, ordering of layers, and precoding information.

6. The method of claim 3, wherein the information comprises:
a size of a data block occupied by the data signal;
a scheme used to modulate the data signal; and
hybrid automatic repeat request information.

7. The method of claim 3, further comprising:
decoding, at a receiver, the control signal by recursively applying the first signal format and the second signal format until the control signal is decoded.

8. The method of claim 3, further comprising:
determining, at the receiver, whether the data signal is transmitted using a rank value of 1 or higher; and
when the signal is transmitted using a rank value of 1:
disposing the receiver to decode the control signal by applying the first signal format,
determining whether the decoding of the control signal using the first signal format is performed successfully,
processing the data signal by assuming that the data is modulated with the single codeword when the control signal is decoded successfully using the first signal format, and
terminating the processing of the data signal when the control signal is not decoded successfully using the first signal format.

9. The method of claim 3, further comprising:
when the control signal uses the first signal format:
disposing the control signal to carry a first number of bits,
coding the control signal by using a first code rate,
modulating the control signal by using a first modulation scheme, and
transmitting the control signal by using a first amount of physical resources; and
when the control signal uses the second signal format:
disposing the control signal to carry a second number of bits,
coding the control signal by using a second code rate,
modulating the control signal by using a second modulation scheme, and
transmitting the control signal by using a second amount of physical resources,
wherein the first number of bits is less than the second number of bits, the first code rate is less than the second code rate, the first modulation scheme is the same as the second modulation scheme, and the first amount of physical resources is the same as the second amount of physical resources.

10. The method of claim 3, further comprising:
when the control signal uses the first signal format:
disposing the control signal to carry a first number of bits,
coding the control signal by using a first code rate,
modulating the control signal by using a first modulation scheme, and
transmitting the control signal by using a first amount of physical resources; and
when the control signal uses the second signal format:
disposing the control signal to carry a second number of bits,
coding the control signal by using a second code rate,
modulating the control signal by using a second modulation scheme, and
transmitting the control signal by using a second amount of physical resources,
wherein the first number of bits is less than the second number of bits, the first code rate is higher than the second code rate, the first modulation scheme is in a higher order than the second modulation scheme, and the first amount of physical resources is less than the second amount of physical resources.

11. The method of claim 3, further comprising:
transmitting the control signal using one transmission layer when the control signal uses the first signal format; and
transmitting the control signal using either one transmission layer or two transmission layers when the control signal uses the second signal format.

12. The method of claim 3, further comprising:
allocating a first set of time-frequency resource elements to the control signal coded using the first signal format; and
allocating a second set of time-frequency recourse elements to the control signal coded using the second signal format.

13. The method of claim 3, further comprising:
allocating a first set of time slots and the frequencies associated with the first set of time slots to the control signals coded with the first signal format; and
allocating a second set of time slots and the frequencies associated with the second set of time slots to the control signals coded with the second signal format.

14. A transmitter for transmitting data to a receiver,
the transmitter configured to:
modulate a data signal with either a single codeword or two codewords;
code a control signal using a first signal format for carrying information regarding the single codeword when the data signal is modulated with the single codeword;
code the control signal using a second signal format for carrying information regarding both of the two codewords when the transmitter modulates the data signal with the two codewords; and
transmit the control signal accompanied by the control signal.

15. The transmitter of claim 14, wherein when the control signal uses the first signal format, the transmitter is further configured to:
dispose the control signal to carry a first number of bits,
code the control signal by using a first code rate,
modulate the control signal by using a first modulation scheme, and
transmit the control signal by using a first amount of physical resources;
wherein when the control signal uses the second signal format, the transmitter is further configured to:
dispose the control signal to carry a second number of bits,
code the control signal by using a second code rate, modulate the control signal by using a second modulation scheme, and transmit the control signal by using a second amount of physical resources, and wherein the first number of bits is less than the second number of bits, the first code rate is less than the second code rate, the first modulation scheme is the same as the second modulation scheme, and the first amount of physical resources is the same as the second amount of physical resources.

16. The transmitter of claim 14, wherein when the control signal uses the first signal format, the transmitter is further configured to:

dispose the control signal to carry a first number of bits, code the control signal by using a first code rate, modulate the control signal by using a first modulation scheme, and transmit the control signal by using a first amount of physical resources;

wherein when the control signal uses the second signal format, the transmitter is further configured to:

dispose the control signal to carry a second number of bits, code the control signal by using a second code rate, modulate the control signal by using a second modulation scheme, and transmit the control signal by using a second amount of physical resources, and wherein the first number of bits is less than the second number of bits, the first code rate is higher than the second code rate, the first modulation scheme is in a higher order than the second modulation scheme, and the first amount of physical resources is less than the second amount of physical resources.

17. The transmitter of claim 14, wherein the transmitter is further configured to transmit the control signal using one transmission layer when the control signal uses the first signal format, and wherein the transmitter is further configured to transmit the control signal using either one transmission layer or two transmission layers when the control signal uses the second signal format.

18. A receiver for receiving data signal accompanied by a control signal, the receiver comprising:

a decoder configured to decode the control signal using either a first signal format or a second signal format, the first signal format being used when the data signal has been transmitted using a single codeword, and the second signal format being used when the data signal has been transmitted using a second codeword;

a first determination unit configured to determine whether the control signal has been decoded by the decoder;

a processor configured to process the data signal; and a control unit configured to send instructions to:

instruct the decoder to decode the control signal using the first signal format;

instruct the first determination unit to determine whether the control signal has been decoded by using the first signal format;

instruct the processor to process the data signal by assuming that the data is transmitted using the single codeword transmission when the control signal is decoded using the first signal;

instruct the decoder to decode the control signal using the second signal format when the control signal is not decoded using the first signal;

instruct the first determination unit to determine whether the decoding using the second signal format is successfully performed;

instruct the processor to process the data signal by assuming that the data is transmitted using the two codewords transmission when the control signal is decoded using the second signal format; and terminate the processing of the data signal when the control signal is not decoded using the second signal format.

19. The receiver of claim 18, further comprising a second determination unit configured to determine whether the data signal was transmitted using a rank value of 1 or higher, wherein when it is determined that the signal was transmitted using a rank value of 1, the control unit is further configured to:

instruct the decoder to decode the control signal using the first signal format, instruct the first determination unit to determine whether the control signal is decoded using the first signal format, instruct the processor to process the data signal by assuming that the data is transmitted using the single codeword transmission when the control signal is decoded, and terminate the processing of the data signal when the control signal is not decoded.

* * * * *